(12) United States Patent
Huelke

(10) Patent No.: US 7,651,154 B1
(45) Date of Patent: Jan. 26, 2010

(54) ONE PIECE MODULAR DESIGN FOR REAR SEAT HEAD RESTRAINTS AND SNAP IN BRACKET DESIGN

(75) Inventor: David R. Huelke, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/204,406

(22) Filed: Sep. 4, 2008

(51) Int. Cl.
*B60N 2/48* (2006.01)
(52) U.S. Cl. .................................. 296/187.01
(58) Field of Classification Search ............ 296/187.01; 297/61, 220, 283.4, 391, 394, 395, 404, 405
See application file for complete search history.

(56) References Cited

U.S. PATENT DOCUMENTS

| | | | | |
|---|---|---|---|---|
| 1,716,708 | A * | 6/1929 | Shipley et al. | 211/123 |
| 3,222,084 | A * | 12/1965 | Hesen | 280/748 |
| 3,253,859 | A * | 5/1966 | Merriman et al. | 297/397 |
| 3,393,938 | A * | 7/1968 | Meyer et al. | 297/397 |
| 3,964,788 | A * | 6/1976 | Kmetyko | 297/395 |
| 4,249,754 | A * | 2/1981 | Best | 280/751 |
| 4,838,575 | A * | 6/1989 | Livingston | 280/748 |
| 4,869,448 | A * | 9/1989 | Kenyon | 248/118 |
| 5,011,226 | A | 4/1991 | Ikeda et al. | |
| 5,346,282 | A * | 9/1994 | De Filippo | 297/395 |
| 6,050,633 | A * | 4/2000 | Droual | 297/61 |
| 6,893,095 | B2 * | 5/2005 | Schambre et al. | 297/406 |

FOREIGN PATENT DOCUMENTS

| | | |
|---|---|---|
| DE | 3506074 | 8/1986 |
| DE | 19928854 | 7/2000 |
| DE | 69800787 | 10/2001 |
| EP | 0562240 | 9/1993 |

* cited by examiner

*Primary Examiner*—H Gutman
(74) *Attorney, Agent, or Firm*—Gregory Brown; Price, Heneveld, Cooper, DeWitt & Litton, LLP

(57) ABSTRACT

A vehicle comprising a frame having a rear seat and first and second side structural walls. A modular unit extends between and is fixedly connected to the first side structural wall and the second side structural wall, with the unit having a pin on a first side thereof and a non-circular bracket on a second side thereof. The first side structural wall has an opening for accepting the pin of the modular unit therein. The second side structural wall has a slot therein for accepting the non-circular bracket of the modular unit therein, with the slot having a first open end for accepting the non-circular bracket therein and a second non-circular end whereby the non-circular bracket can be rotated within the slot to assist in fixing the modular unit in position relative to the frame. The modular unit is non-removably fixed in position relative to the frame after installation.

20 Claims, 3 Drawing Sheets

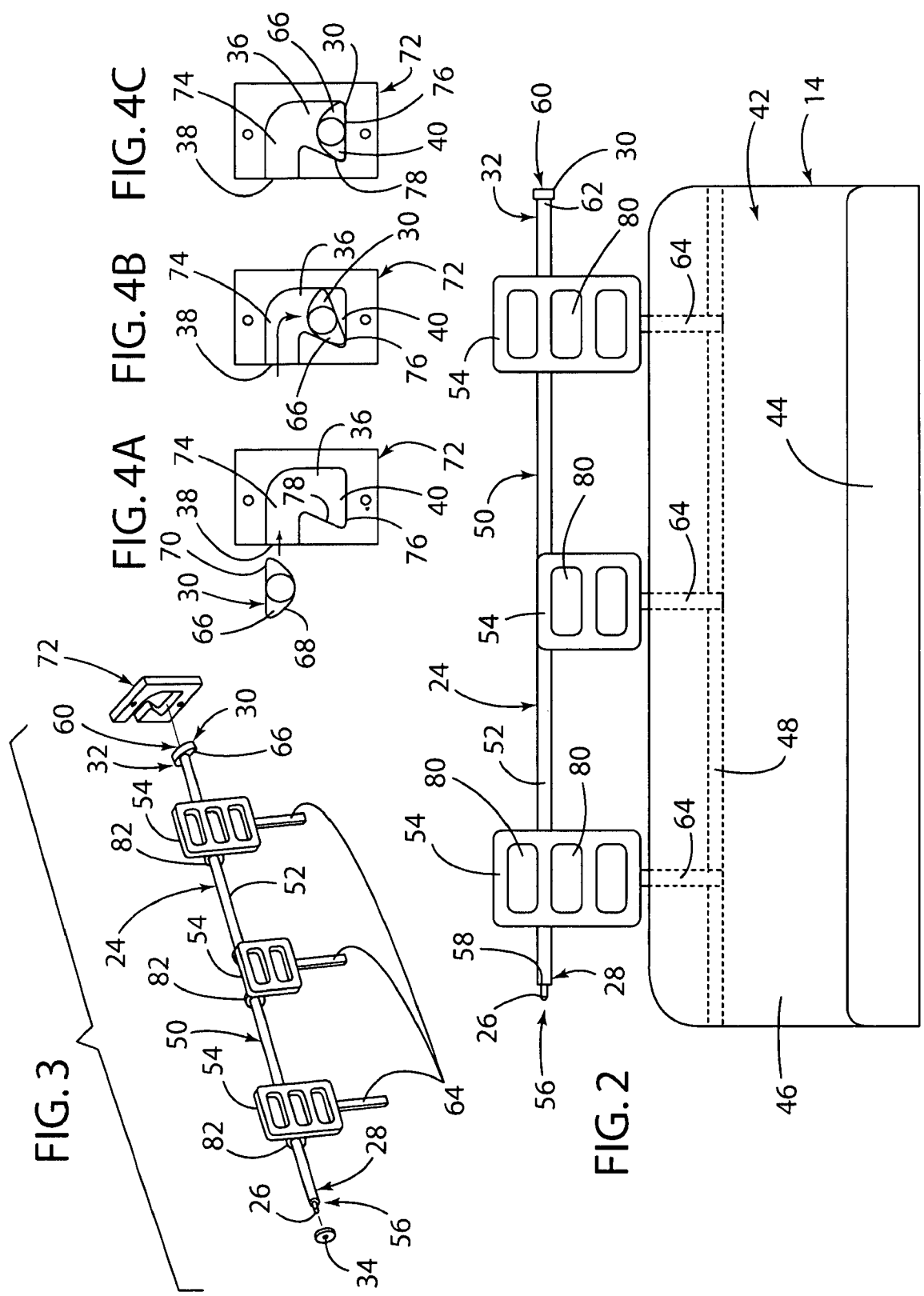

ONE PIECE MODULAR DESIGN FOR REAR SEAT HEAD RESTRAINTS AND SNAP IN BRACKET DESIGN

FIELD OF THE INVENTION

The present invention concerns vehicles, and more particularly relates to a modular rear seat head restraint for a vehicle.

BACKGROUND OF THE INVENTION

Head restraints are typically positioned in vehicles above passenger seats for preventing rearward movement of a passenger's head.

SUMMARY OF THE PRESENT INVENTION

An aspect of the present invention is to provide a vehicle comprising a frame having a rear seat, with a first side structural wall adjacent a first side of the rear seat and a second side structural wall adjacent a second side of the rear seat. A modular unit extends between and is fixedly connected to each of the first side structural wall and the second side structural wall, with the modular unit having a pin on a first side thereof and a non-circular bracket on a second side thereof. The first side structural wall has an opening for accepting the pin of the modular unit therein. The second side structural wall has a slot therein for accepting the non-circular bracket of the modular unit therein, with the slot having a first open end for accepting the non-circular bracket of the modular unit therein and a second non-circular end whereby the non-circular bracket can be rotated within the slot to assist in fixing the modular unit in position relative to the frame. The modular unit is non-removably fixed in position relative to the frame after installation.

Another aspect of the present invention is to provide a modular head restraint assembly comprising a horizontally orientated tube, at least one padded head restraint connected to the tube, a first connection member at a first side of the tube, a second connection member at a second side of the tube, and a strap connected to each of the at least one padded head restraint at a bottom portion thereof. The modular head restraint assembly is configured to be connected to a vehicle frame by engaging the first connection member and the second connection member with the vehicle frame and by connecting the strap for each of the at least one padded head restraint to the vehicle frame.

Yet another aspect of the present invention is to provide a method of attaching a head restraint assembly to a vehicle having a frame including a rear seat, a first side structural wall adjacent a first side of the rear seat and a second side structural wall adjacent a second side of the rear seat. The method comprises providing a tube having a first connection member at a first side thereof and a second connection member at a second side thereof. The method also includes connecting at least one padded head restraint to the tube, connecting a strap to each of the at least one padded head restraint at a bottom portion thereof, engaging the first connecting member with the first side structural wall of the frame, engaging the second connecting member with the second side structural wall of the frame, and connecting the strap for each of the at least one padded head restraint to the frame.

These and other aspects, objects, and features of the present invention will be understood and appreciated by those skilled in the art upon studying the following specification, claims, and appended drawings.

BRIEF DESCRIPTION OF DRAWINGS

FIG. 2 is a front view of a modular head restraint embodying the present invention.

FIG. 3 is a perspective view of the modular head restraint, a first side connection and a second side connection embodying the present invention.

FIGS. 4A-4C are side views of the second side connection of the modular head restraint embodying the present invention.

DETAILED DESCRIPTION OF PREFERRED EMBODIMENTS

Figure 1:
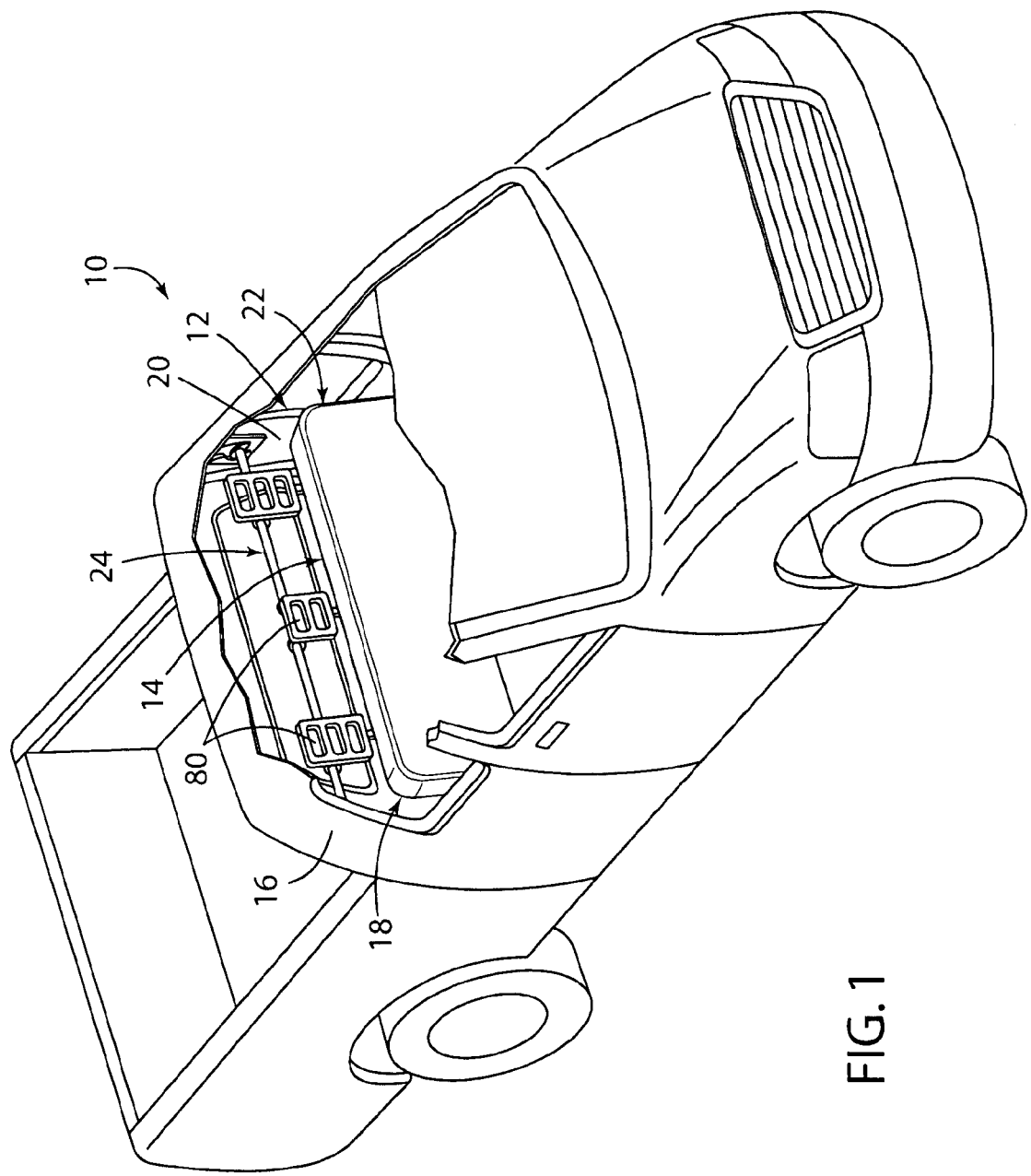
FIG. 1 is a perspective view of a vehicle embodying the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a vehicle embodying the present invention. In the illustrated example, the vehicle 10 comprises a frame 12 having a rear seat 14, a first side structural wall 16 adjacent a first side 18 of the rear seat 14 and a second side structural wall 20 adjacent a second side 22 of the rear seat 14. A modular unit 24 extends between and is fixedly connected to each of the first side structural wall 16 and the second side structural wall 20. The modular unit 24 has a pin 26 on a first side 28 thereof and a non-circular bracket 30 on a second side 32 thereof. The first side structural wall 16 has an opening 34 for accepting the pin 26 of the modular unit 24 therein. The second side structural wall 20 has a slot 36 therein for accepting the non-circular bracket 30 of the modular unit 24 therein. The slot 36 has a first open end 38 for accepting the non-circular bracket 30 of the modular unit 24 therein and a second non-circular end 40 whereby the non-circular bracket 30 can be rotated within the slot 36 to assist in fixing the modular unit 24 in position relative to the frame 12. The modular unit 24 is non-removably fixed in position relative to the frame 12 after installation.

In the illustrated example, the vehicle 10 comprises a pick-up truck. The pick-up truck has the rear seat 14 behind a front row of seats (not shown). The rear seat 14 can comprise a unitary bench 42 having a seating portion 44 and a backrest portion 46. However, it is contemplated that the rear seat 14 could comprise at least two bucket seats. It is also contemplated that the backrest portion 46 of the unitary bench 42 could fold down relative to the seating portion 44 and/or be split to allow partial folding of the backrest portion 46. The vehicle 10 includes a frame member or members 48 located behind the backrest portion 46 or located within the backrest portion 46. Such frame member or members 48 are well known to those skilled in the art and are used to support a child restraint seat to the rear seat (typically by having a latch on the child restraint seat connect to the frame member or members 48 over a top of the backrest portion 46). The frame member or members 48 are illustrated in FIG. 2 as being a single horizontal bar. However, it is contemplated that the frame member or members 48 could comprise any structural member. Moreover, it is contemplated that the vehicle 10 could be any vehicle (e.g., pick-up truck, van, sedan, etc.).

The illustrated modular unit 24 is connected to the frame 12 of the vehicle 10. In the illustrated embodiment, the modular unit 24 comprises a modular head restraint assembly 50 (FIGS. 2-3). The modular head restraint assembly 50 comprises a horizontally orientated tube 52, a plurality of head restraints 54 connected to the tube 52, a first connection member 56 at a first side 58 of the tube 52 and a second connection member 60 at a second side 62 of the tube 52. Each head restraint 54 also includes a strap 64 at a bottom portion thereof for assisting in connecting the modular head restraint assembly 50 to the frame 12 as discussed in more detail below. In the illustrated example, the first connection member 56 comprises the pin 26 and the second connection member 60 comprises the non-circular bracket 30. However, it is contemplated that the second connection member 60 could comprise the pin 26 and the first connection member 56 could comprise the non-circular bracket 30. Moreover, it is contemplated that the first connection member 56 and the second connection member 60 could comprise any connection members for connecting the modular head restraint assembly 50 to the frame 12. Furthermore, while the tube 52 is illustrated as having a circular cross section, it is contemplated that the tube 52 could have any cross-sectional shape and could have any cross section dimension (including a changing cross-sectional shape along the length of the tube 52).

In the illustrated example, the tube 52 of the modular head restraint assembly 50 is connected to the frame 12 by the first connection member 56 and the second connection member 60. As illustrated in FIGS. 2-3, the first connection member 56 can comprise the pin 26. The pin 26 connects the tube 52 to the frame 12 by inserting the tube 52 into the opening 34 in the first side structural wall 16 of the frame 12. It is contemplated that the opening 34 can be directly located in the first side structural wall 16, can be located in a washer directly connected to the first side structural wall 16, or can be located in any other object directly connected to the first side structural wall 16 (thereby forming part of the first side structural wall 16).

The illustrated second connection member 60 connects the second side 62 of the tube 52 to the frame 12. The second connection member 60 can comprise the non-circular bracket 30. In the illustrated embodiment, the non-circular bracket 30 comprises a plate 66 having a curved edge 68 and a flat edge 70 thereby forming a substantially D-shaped profile. The non-circular bracket 30 is connected to a holding bracket 72 having the slot 36 therein. The holding bracket 72 can comprise a portion of the second side structural wall 20 or can be directly connected to the second side structural wall 20 (thereby forming part of the second side structural wall 20). The slot 36 includes the first open end 28, the second non-circular end 40 and a connection portion 74 between the first open end 28, and the second non-circular end 40. As illustrated in FIGS. 4A-4C, the non-circular bracket 30 of the modular head restraint assembly 50 is connected to the holding bracket 72 by inserting the non-circular bracket 30 into the first opening end 28 of the slot 36, sliding the non-circular bracket 30 through the connection portion 74 of the slot 36 and rotating the non-circular bracket 30 such that the flat edge 70 of the plate 66 abuts a flat edge 76 of the second non-circular end 40. In the illustrated example, the second non-circular end 40 includes a tab 78 such that the non-circular bracket 30 will snap into position within the second non-circular end 40 of the slot 36. While the plate 66 is illustrated as having a D-shaped profile, it is contemplated that the plate 66 could have any profile.

In the illustrated example, the head restraints 54 are connected to the tube 52 of the modular head restraint assembly 50. The head restraints 54 can have any configuration and can be padded. Furthermore, while three head restraints 54 are shown with two of the head restraints 54 being similar and one of the head restraints 54 being different than the remaining head restraints 54, it is contemplated that any number of head restraints 54 (including one) could be used and that the head restraints 54 could all be similar, any number less than all of the head restraints 54 could be similar or all of the head restraints 54 could have a different configuration. In the illustrated example, the head restraints 54 include apertures 80 for allowing a driver of the vehicle 10 to easily see through the head restraints 54 using a rear view mirror and/or a middle one of the head restraints 54 could be lower than any outer head restraints 54 (as shown) to allow the driver of the vehicle 10 to see over the head restraints 54 using the rear view mirror.

The illustrated head restraints 54 can be connected to the tube 52 in any manner. For example, the head restraints 54 can be attached to the tube 52 using a fastener (e.g., a screw or screws), can be permanently attached to the tube 52 (e.g., by having the tube 52 extend through the head restraints 54 or having the head restraints 54 welded to the tube 52), can be snapped onto the tube 52 using a hook attachment, can have rings 82 thereon for allowing the tube 52 to slide through the rings 82 (with a possible further attachment using fasteners) or connected in any other manner.

In the illustrated embodiment, the straps 64 of the modular head restraint assembly 50 assist in connecting the modular head restraint assembly 50 to the vehicle 10. The straps 64 are connected to a bottom portion of the head restraints 54 and hang downwardly therefrom. The straps 64 can extend behind the rear seat 14 and are connected to the frame member or members 48. For example, the straps 64 can hook onto the frame member or members 48, can be fastened to the frame member or members 48 using fasteners (e.g., screws), or can connect to the frame member or members 48 in any manner. It is also contemplated that the straps 64 could extend into the backrest portion 46 of the rear seat 14 to connect to the frame member or members 48. The straps 64 can be made of any flexible or rigid materials that would help to assist in maintaining the head restraints 54 in position.

Accordingly, an aspect of the present invention is to provide a method of attaching the head restraint assembly 50 to the vehicle 10 by providing the tube 52, connecting at least one padded head restraint 54 to the tube 52, connecting the strap 64 to each of the padded head restraints 54 at a bottom portion thereof, engaging the first connecting member 56 with the first side structural wall 16 of the frame 12, engaging the second connecting member 60 with the second side structural wall 20 of the frame 12, and connecting the strap 64 for the one padded head restraints 54 to the frame 12. In the illustrated embodiment, the modular unit 24 is factory-installed into the vehicle 10 and not removable therefrom. However, it is contemplated that the modular unit 24 could be removably connected to the frame 12.

Figure 5:
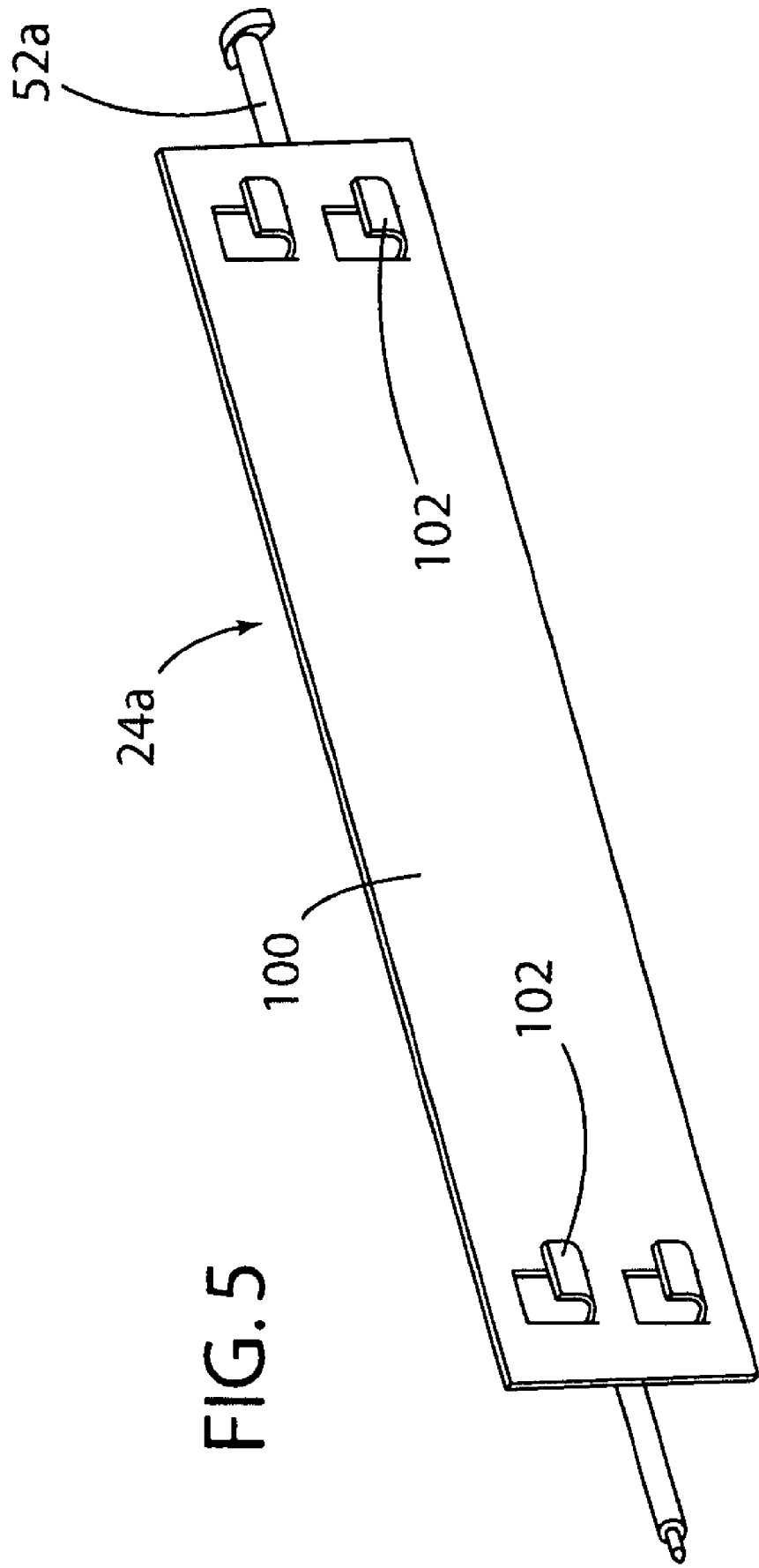
FIG. 5 is a front view of a rack embodying the present invention.

The reference numeral 24a (FIG. 5) generally designates another embodiment of the present invention, having a second embodiment for the modular unit. Since modular unit 24a is similar to the previously described modular unit, similar parts appearing in FIGS. 1-4 and FIG. 5, respectively, are represented by the same, corresponding reference number, except for the suffix "a" in the numerals of the latter. The modular unit 24*a* is configured for other uses than that of a headrest. For example, the modular unit 24*a* can comprise a board 100 having hooks 102 thereon for accepting firearms or fishing poles, with the board 100 being connected to the tube 52*a* in the same manner as the head restraints 54 are connected to the tube 52 as discussed above. The modular unit 24*a* could also comprise a single tube having an attachment member thereon for connecting to a leash of a pet (e.g., a dog).

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A vehicle comprising:
    a frame having a rear seat, a first side structural wall adjacent a first side of the rear seat and a second side structural wall adjacent a second side of the rear seat; and
    a modular unit extending between and fixedly connected to each of the first side structural wall and the second side structural wall, the modular unit having a pin on a first side thereof and a non-circular bracket on a second side thereof;
    the first side structural wall having an opening for accepting the pin of the modular unit therein;
    the second side structural wall having a slot therein for accepting the non-circular bracket of the modular unit therein, the slot having a first open end for accepting the non-circular bracket of the modular unit therein and a second non-circular end whereby the non-circular bracket can be rotated within the slot to assist in fixing the modular unit in position relative to the frame;
    wherein the modular unit is non-removably fixed in position relative to the frame after installation.

2. The vehicle of claim 1, wherein:
    the modular unit comprises a board with hooks thereon.

3. The vehicle of claim 1, wherein:
    the modular unit comprises a tube.

4. The vehicle of claim 1, wherein:
    the modular unit comprises a modular head restraint assembly including a horizontally orientated tube, at least one padded head restraint connected to the tube, and a strap connected to each of the at least one padded head restraint at a bottom portion thereof; and
    the modular head restraint assembly is configured to be connected to the vehicle frame by engaging the first connection member and the second connection member with the vehicle frame and by connecting the strap for each of the at least one padded head restraint to the vehicle frame.

5. The vehicle of claim 4, wherein:
    the rear seat includes a structural member therein; and
    the strap is connected to the structural member.

6. The vehicle of claim 1, wherein:
    the non-circular bracket includes a flat edge and a non-flat edge.

7. The vehicle of claim 1, wherein:
    the slot includes a tab for allowing the non-circular bracket to snap into position.

8. A modular head restraint assembly comprising:
    a horizontally orientated tube;
    at least one padded head restraint connected to the tube;
    a first connection member at a first side of the tube;
    a second connection member at a second side of the tube; and
    a strap connected to each of the at least one padded head restraint at a bottom portion thereof;
    wherein the modular head restraint assembly is configured to be connected to a vehicle frame by engaging the first connection member and the second connection member with the vehicle frame and by connecting the strap for each of the at least one padded head restraint to the vehicle frame.

9. The modular head restraint assembly of claim 8, wherein:
    the first connection member comprises a pin extending from an end of the tube.

10. The modular head restraint assembly of claim 8, wherein:
    the second connection member comprises a non-circular bracket.

11. The modular head restraint assembly of claim 10, wherein:
    the non-circular bracket includes a flat edge and a non-flat edge.

12. The modular head restraint assembly of claim 8, wherein:
    the at least one padded head restraint includes at least one aperture therethrough to allow viewing through the at least one padded head restraint.

13. The modular head restraint assembly of claim 8, wherein:
    the at least one padded head restraint comprises a plurality of head restraints.

14. The modular head restraint assembly of claim 13, wherein:
    at least two of the head restraints have a different configuration.

15. A method of attaching a head restraint assembly to a vehicle having a frame including a rear seat, a first side structural wall adjacent a first side of the rear seat and a second side structural wall adjacent a second side of the rear seat, the method comprising:
    providing a tube, the tube having a first connection member at a first side thereof and a second connection member at a second side thereof;
    connecting at least one padded head restraint to the tube;
    connecting a strap to each of the at least one padded head restraint at a bottom portion thereof;
    engaging the first connecting member with the first side structural wall of the frame;
    engaging the second connecting member with the second side structural wall of the frame; and
    connecting the strap for each of the at least one padded head restraint to the frame.

16. The method of attaching a head restraint assembly to a vehicle of claim 15, wherein:
    the first connection member comprises a pin extending from an end of the tube; and
    engaging the first connecting member with the first side structural wall of the frame includes inserting the pin into an opening in the first side structural wall.

17. The method of attaching a head restraint assembly to a vehicle of claim 15, wherein:
    the second connection member comprises a non-circular bracket;
    the second side structural wall has a slot therein having a first open end and a second non-circular end;
    engaging the second connecting member with the second side structural wall of the frame comprises inserting the non-circular bracket into the first open end of the slot and moving the non-circular bracket through the slot until the non-circular bracket abuts the second non-circular end of the slot.

18. The method of attaching a head restraint assembly to a vehicle of claim 17, wherein:

the non-circular bracket includes a flat edge and a non-flat edge.

19. The method of attaching a head restraint assembly to a vehicle of claim 18, wherein:

the slot includes a tab for allowing the non-circular bracket to snap into position.

20. The method of attaching a head restraint assembly to a vehicle of claim 15, wherein:

the at least one padded head restraint comprises at least three head restraints.

* * * * *